Nov. 6, 1923.
F. K. LAWRENCE
1,472,983
CARRIER FOR SPARE WHEELS AND THE LIKE
Filed June 27, 1921
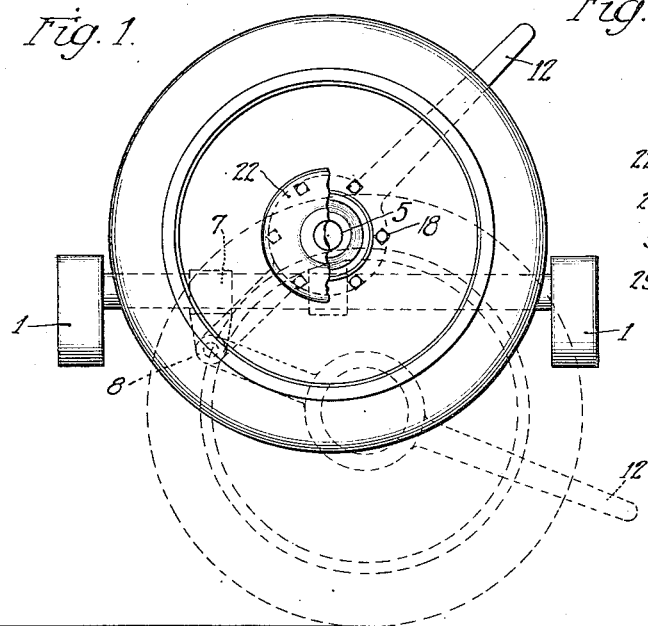
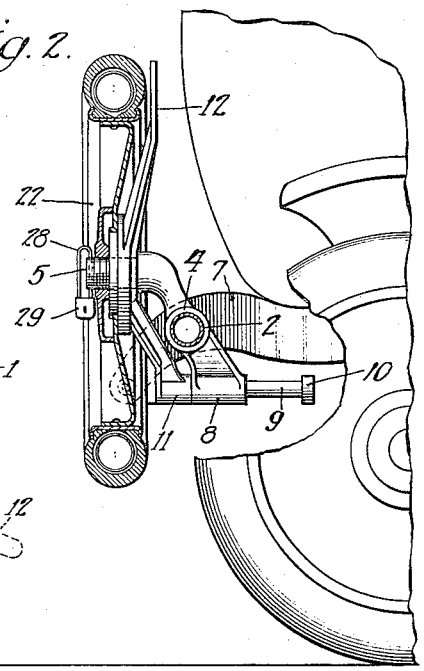
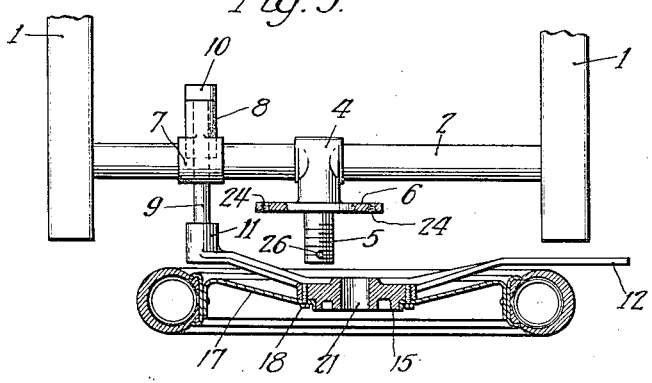
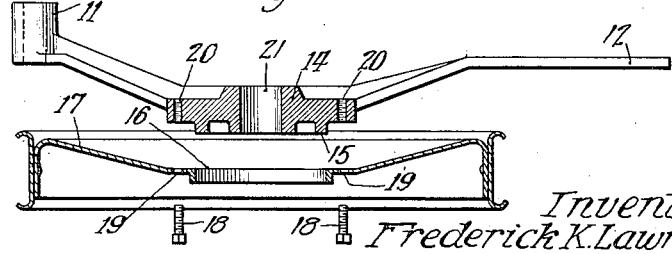
Inventor
Frederick K. Lawrence.
By: Cheever & Cox Attys Patented Nov. 6, 1923.

1,472,983

UNITED STATES PATENT OFFICE.

FREDERICK K. LAWRENCE, OF CHICAGO, ILLINOIS, ASSIGNOR, BY DIRECT AND MESNE ASSIGNMENTS, TO SELF-MOUNTING CARRIER COMPANY, OF WILMINGTON, DELAWARE, A CORPORATION OF DELAWARE.

CARRIER FOR SPARE WHEELS AND THE LIKE.

Application filed June 27, 1921. Serial No. 480,583.

*To all whom it may concern:*

Be it known that I, FREDERICK K. LAWRENCE, a citizen of the United States, residing at Chicago, in the county of Cook and State of Illinois, have invented a certain new and useful Improvement in Carriers for Spare Wheels and the like, of which the following is a specification.

My invention relates to carriers for vehicle tires, spare wheels and the like, frequently called "tire racks" and the general object of the invention is to provide efficient means not only for transporting the object after it is in traveling position, but also for facilitating raising it from the ground to traveling position and vice versa. Spare tires of the larger sizes are so heavy that it is difficult and in some cases impossible for the person in charge of the vehicle to raise and lower the tire without assistance. This is especially true with disc wheels, and my purpose is to reduce the strain upon the person in charge. In my Reissue Patent No. 15,546 I have described a carrier showing the basic idea, but in the present case I have shown a particular manner of accomplishing the result. My present carrier and the one shown in my reissue patent may be termed "lifting carriers" in view of the fact that they afford means for lifting the tire and its mounting from the ground to traveling position on the vehicle. They employ levers for reducing the intensity of effort which the operator must exert in raising the wheel. According to my present invention the lever rotates about an axis which is perpendicular to the plane of the tire. Another object is to provide convenient means for locking the tire against unauthorized removal. Still other objects of the invention will hereinafter become apparent.

I obtain my objects by the mechanism illustrated in the accompanying drawings in which—

Figure 1 is a rear elevation of my carrier and shows the same in conjunction with certain parts of the vehicle on which it is mounted.

Figure 2 is a side elevation of the same partly in section.

Figure 3 is a plan view of the parts shown in Figure 1, the wheel being shown in axial section.

Figure 4 is a distributive view showing the relationship of the parts.

Like numerals denote like parts throughout the several views.

Referring to the accompanying drawings, the elements 1 represent parts of the body of the vehicle. These parts support a stationary cross bar 2. A bracket 4 is rigidly secured to said bar and is provided with a horizontal stud 5. The bracket preferably also has a disc 6 at the rear end of the stud whose function will be hereinafter explained. The bracket 4 is usually fastened at the center of the bar 2. At one side of the bracket a hanger 7 is rigidly fastened to the bar, said hanger having a sleeve 8 at the lower end. Pin 9 is both slidable and rotatable in sleeve 8 and is provided with a head 10 at the inner end which prevents it from being withdrawn from the sleeve. Said pin is rigidly fastened to a boss 11 formed at one end of the operating lever 12. Said lever is also provided with a portion 14 which for convenience of description will be referred to as a "false hub." This has an annular flange 15 which fits into the ring 16 forming the central opening of the web 17 of a disc wheel. The arrangement is such that ring 16 may be slipped over the flange 15 after which the wheel may be bolted in place by means of bolts 18 which pass through holes 19 in the wheel and screw into holes 20 in the false hub. The false hub 14 has a center hole 21 of a diameter large enough to permit it to be freely slipped over the stud 5 and the false hub brought into contact with the disc 6.

By preference the stud 5 is threaded to take an internally threaded cap 22 which is of a diameter great enough to enclose the heads of the bolts 18 when the parts are assembled. This cap is suitably apertured to receive bolts by which it may be secured to the disc 6 previously mentioned. Said disc may be provided with internally threaded holes 24 for the purpose. Near the outer end of stud 15 is a hole 26 for receiving the bow or shackle 28 of a padlock 29 as shown in Figure 2. When this padlock is in place it will prevent cap 22 from being unscrewed from the stud 15 and will prevent the removal of the wheel disc.

In practice, when it is desired to apply a wheel, the lever 12 is first pulled rearward, toward the operator and then swung downward to the position shown in dotted lines in Figure 1. The wheel is next bolted to the false hub 14. The operator then grasps the lever and raises the wheel from the position shown in dotted lines, Figure 1, to the position shown in full lines in Figures 1 and 3. This raising of the wheel and tire may be performed with comparative ease because of the leverage afforded by the length of the lever 12. Ordinarily the length of the lever is more than twice the distance from the fulcrum pin 9 to the center of the false hub 14 (which is substantially at the center of gravity of the wheel). As soon as the wheel has thus been raised, the operator pushes it forward so that the false hub will slip over the stud 5. The operator continues to push the wheel forward until the false hub engages the disc 6, as shown in Figure 2. He then applies cap 22 by screwing it onto the projecting end of the stud 5. This cap covers the bolts 18 and prevents anybody from unscrewing them and thus removing the wheel. The bow of the padlock 29 is then inserted through the hole 26 of stud 5 and the padlock applied, which effectually prevents the cap from being removed.

If it is desired to hold the cap very tightly in contact with the wheel, it may be accomplished by bolting the cap to disc 24. In such case the bolts will be longer than the bolts 18 and will penetrate some of the holes 19 and 20, which are left vacant for the purpose.

It will be evident that a carrier of this kind is not only simple in construction, but affords ready means by which the operator without much exertion may raise the wheel from the ground and securely fasten it in traveling position to the vehicle.

It will be understood by those familiar with this art that vehicle tires are in some cases used in connection with demountable rims, in other cases with disc wheels and in still other cases with wire wheels. So far as my invention is concerned, viewed in its fundamental aspect, it is immaterial which type of tire mounting is employed; consequently in the appended claims, I use the term "tire mounting" to include these various types.

Having thus described my invention, what I claim as new and desire to secure by Letters Patent is:

1. A lifting carrier for spare wheels and the like having a lifting lever for supporting the tire mounting, the lever being pivoted to the vehicle and being swingable about an axis perpendicular to the plane of the tire.

2. A lifting carrier for spare wheels and similar tire mountings, having a lever pivoted to the vehicle and having an axis perpendicular to the plane of the tire mounting, the lever having a handle at the outer end and having means between its ends for supporting the tire mounting.

3. A lifting carrier for spare wheels and the like having a lifting lever for supporting the tire mounting, the lever being pivoted to the vehicle and being swingable about an axis perpendicular to the plane of the tire, the lever also being shiftable in the direction of its axis of rotation.

4. A carrier for spare wheels and the like having a lever fulcrumed upon the vehicle body and rotatable about a horizontal axis parallel to the direction of motion of the vehicle, the lever being also slidable in an axial direction, a fixed bracket upon the vehicle body, having a horizontal portion, and a member adapted to support the carried object and adapted to slidingly fit said horizontal portion and to be supported by the bracket when the parts are in cooperative engagement.

5. A carrier for spare wheels and the like having a lever fulcrumed upon the vehicle body, the lever being slidable on its fulcrum in a direction normal to its plane of rotation, a fixed bracket upon the vehicle body having a horizontal portion, the lever being adapted to support a spare wheel and being slidable upon the horizontal portion of the fixed bracket.

6. A lifting carrier for spare wheels and similar tire mountings having a stationary bracket with a horizontal portion, a fulcrum mounted on the vehicle, a lever which is slidable upon said fulcrum in the direction of its axis of rotation, the lever being provided between its ends with an element for supporting the tire mounting, said element being slidably cooperative with the horizontal portion of the bracket when in alinement therewith.

7. A lifting carrier for spare wheels and similar tire mountings having a stationary bracket with a horizontal portion, a lever having a pivot supported by the vehicle, the axis of the pivot being parallel to the horizontal portion of the bracket and the lever being slidable upon its pivot in the direction of the axis of rotation, and a false hub for engaging the tire mounting, said hub being mounted upon the lever between its ends and being slidable upon the horizontal portion of the bracket.

8. A lifting carrier for spare wheels and similar tire mountings having a stationary bracket with a horizontal portion, a lever having a pivot supported by the vehicle, the axis of the pivot being parallel to the horizontal portion of the bracket and the lever being slidable upon its pivot in the direction of the axis of rotation, a false hub for engaging the tire mounting, said hub being mounted upon the lever between its ends and being slidable upon the horizontal portion of the bracket, and means for bolting the wheel to the bracket.

9. A lifting carrier having a holder for the tire mounting provided with a stud adapted to pass through the center of the tire mounting when the latter is in position upon the holder, bolts for securing the tire mounting to the holder and a cover adapted to be fastened to said stud on the outside of the tire mounting for covering the bolts whereby the cover when locked in place will prevent access to the bolts and hence prevent the wheel from being removed from the holder.

In witness whereof, I have hereunto subscribed my name,

FREDERICK K. LAWRENCE.